US008049786B2

(12) United States Patent
Pan et al.

(10) Patent No.: US 8,049,786 B2
(45) Date of Patent: Nov. 1, 2011

(54) METHOD FOR IMPROVING IMAGE STITCHING ACCURACY WITH LENS DISTORTION CORRECTION AND DEVICE FOR IMPLEMENTING THE SAME

(75) Inventors: Patrick Pan, Taipei (TW); Christine Lin, Taipei (TW); Benjamin Kuo, Taipei (TW); Tatsumi Mitsushita, Taipei (TW)

(73) Assignee: Sony Taiwan Limited, Taipei (TW)

( * ) Notice: Subject to any disclaimer, the term of this patent is extended or adjusted under 35 U.S.C. 154(b) by 712 days.

(21) Appl. No.: 11/697,988

(22) Filed: Apr. 9, 2007

(65) Prior Publication Data

US 2007/0236595 A1    Oct. 11, 2007

(30) Foreign Application Priority Data

Apr. 10, 2006  (TW) .............................. 95112790 A

(51) Int. Cl.
*H04N 5/225* (2006.01)
(52) U.S. Cl. ........................ 348/218.1; 348/38; 382/294
(58) Field of Classification Search .................. None
See application file for complete search history.

(56) References Cited

U.S. PATENT DOCUMENTS

| | | | |
|---|---|---|---|
| 6,330,399 B1* | 12/2001 | Omura et al. .................. 396/60 |
| 2003/0235344 A1 | 12/2003 | Kang et al. | |
| 2004/0100443 A1* | 5/2004 | Mandelbaum et al. ....... 345/158 |
| 2004/0201708 A1* | 10/2004 | Endo et al. ................ 348/211.1 |
| 2004/0218813 A1* | 11/2004 | Okada et al. .................. 382/167 |
| 2005/0025313 A1* | 2/2005 | Wachtel et al. ................. 380/54 |
| 2005/0122400 A1* | 6/2005 | Kochi et al. ............. 348/207.99 |
| 2005/0179788 A1* | 8/2005 | Okada et al. ............... 348/222.1 |
| 2006/0023276 A1* | 2/2006 | Jeon ............................. 358/540 |
| 2006/0204128 A1* | 9/2006 | Silverstein .................... 382/275 |
| 2007/0097235 A1* | 5/2007 | Miller .......................... 348/241 |

OTHER PUBLICATIONS

Sawhney et al., "True Multi-image Alignment and Its Application to Mosaicing and Lens Distortion Correction," IEEE Transactions on Pattern Analysis and Machine Intelligence, vol. 21, No. 3, Mar. 1999.*
Haritaoglu, "Blending images into one Mosaic," internet webpage from http://www.umiacs.umd.edu/~hismail/Mosaic/node7.html, dated Jul. 12, 1996.*
Gennery, "Least Squares Camera Calibration Including Lens Distortion and Automatic Editing of Calibration Points," JPL, 1998.*
Willson, "Modeling and Calibration of Automated Zoom Lenses," doctoral thesis, Carnegie Mellon University, Jan. 1994.*

* cited by examiner

*Primary Examiner* — Lin Ye
*Assistant Examiner* — Dennis Hogue
(74) *Attorney, Agent, or Firm* — Finnegan, Henderson, Farabow, Garrett & Dunner, L.L.P.

(57) ABSTRACT

The invention provides a method for improving image stitching accuracy and a device for implementing the same, which apply to the multi-camera system for wide-angle image generation. Lens distortion causes mismatches of the features in the overlapping region of the images captured by the multi-camera system. As a result, the mismatches on the stitched wide-angle image are visible. The method and device for improving image stitching accuracy correct the lens distortion before stitching the images captured by the multi-camera system, so that the features in the overlapping region are matched and a seamless wide-angle image is generated by the stitching engine.

14 Claims, 8 Drawing Sheets

Mismatched features in the overlapping region

Undistorted points of the original pattern

Distorted points of the image captured
by the camera on the reference plane

Distorted points of the image captured by the rotated camera

↓ Image transformation to the
reference plane according to the
captured points

The transformed plane mismatches with the reference
plane due to point distortion Matched features in the overlapping region after lens distortion correction Undistorted points of the image captured by the camera on the reference plane after lens distortion correction Undistorted points of the image captured by the rotated camera after lens distortion correction Image transformation to the reference plane according to the captured points The transformed plane matches with the reference plane

METHOD FOR IMPROVING IMAGE STITCHING ACCURACY WITH LENS DISTORTION CORRECTION AND DEVICE FOR IMPLEMENTING THE SAME

BACKGROUND

1. Field of the Invention

The invention relates to improvement in stitching accuracy of the wide-angle image generated by multi-camera system.

2. Related Art

As shown in the prior art of generating a wide-angle image by multi-camera system as claimed in US Patent No. US2003/0235344 A1 and US2005/0025313 A1, a system for generating a seamless wide-angle image using image stitching technique has been disclosed. However, the stitching problem caused by lens distortion was not addressed. The system for generating a wide-angle image utilizes the features in the image overlapping region for stitching point searching and calculation of the image transformation parameters. Due to the lens distortion, the features in the overlapping region are distorted and fail to match perfectly with the adjacent image. The mismatches in the stitched wide-angle image are visible and cannot be easily corrected.

Referring to FIG. 1 that shows a conventional multi-camera system 100, the multi-camera system 100 includes a camera array 101 and an image stitching engine 102. The image stitching engine 102 acquires multiple images from the camera array 101. The images are then transformed onto a common plane and blended, thereby generating a seamless wide-angle image. Each camera of the camera array 101 is connected to an aperture controller 103 by a control bus. An exposure control signal is sent by the image stitching engine 102 to the aperture controllers 103 based on the brightness of the acquired images for feedback control.

Images acquired from the camera array usually overlap. The overlapping regions are used for blending, stitching point searching and calculation of the image transformation parameters. Generally, the conventional multi-camera system utilizes block matching for stitching point searching in the overlapping regions.

Either barrel or pin-cushion distortion happens to the lens of cameras. The distortion brings two major problems to image stitching, i.e., inaccuracy of stitching point searching and inaccuracy of image transformation. FIG. 2 illustrates an example of lens distortion, where the distorted features in the overlapping region introduce deviation on the searched stitching points when block matching for stitching point searching is applied.

When the cameras of the camera array 101 shown in FIG. 1 are rotated, the images captured by the camera array 101 need to be transformed onto a reference plane for stitching. The transformation matrix is calculated by giving four coordinates on the reference plane and four coordinates on the rotated plane which is to be transformed.

Referring to FIG. 3 that shows four points deviated from the ideal coordinates due to lens distortion, this deviation causes inaccuracy of the calculated transformation matrix obtained from the distorted points. As a result, the rotated plane is not transformed exactly to the reference plane, and the features in the overlapping region of the transformed image do no match with those of the reference image. It is very difficult to compensate the mismatches by blending.

In view of the above, the present invention provides a method for correcting lens distortion of the system and a device for implementing the same, so as to overcome the mismatches of the features in the overlapping region of the multiple images and improve the accuracy of wide-angle image stitching, thereby generating a seamless wide-angle image.

SUMMARY OF THE INVENTION

It is an object of the present invention to provide a device for improving image stitching accuracy, which comprises: a camera array, an image stitching engine, optional aperture controllers, and means for correcting lens distortion. The present invention also provides a method for improving image stitching accuracy, which corrects the lens distortion before stitching the images, so that the features in the overlapping region of the images are matched and a seamless wide-angle image is generated by the stitching engine.

The additional objects and advantages of the present invention will be described hereinafter in detail.

BRIEF DESCRIPTIONS OF THE DRAWINGS

DETAILED DESCRIPTION

The invention will be better understood from the detailed description given below and from the accompanying drawings of the embodiments of the inventions. However, known details are omitted herein in order to not unnecessarily obscure the present invention.

Figure 4:
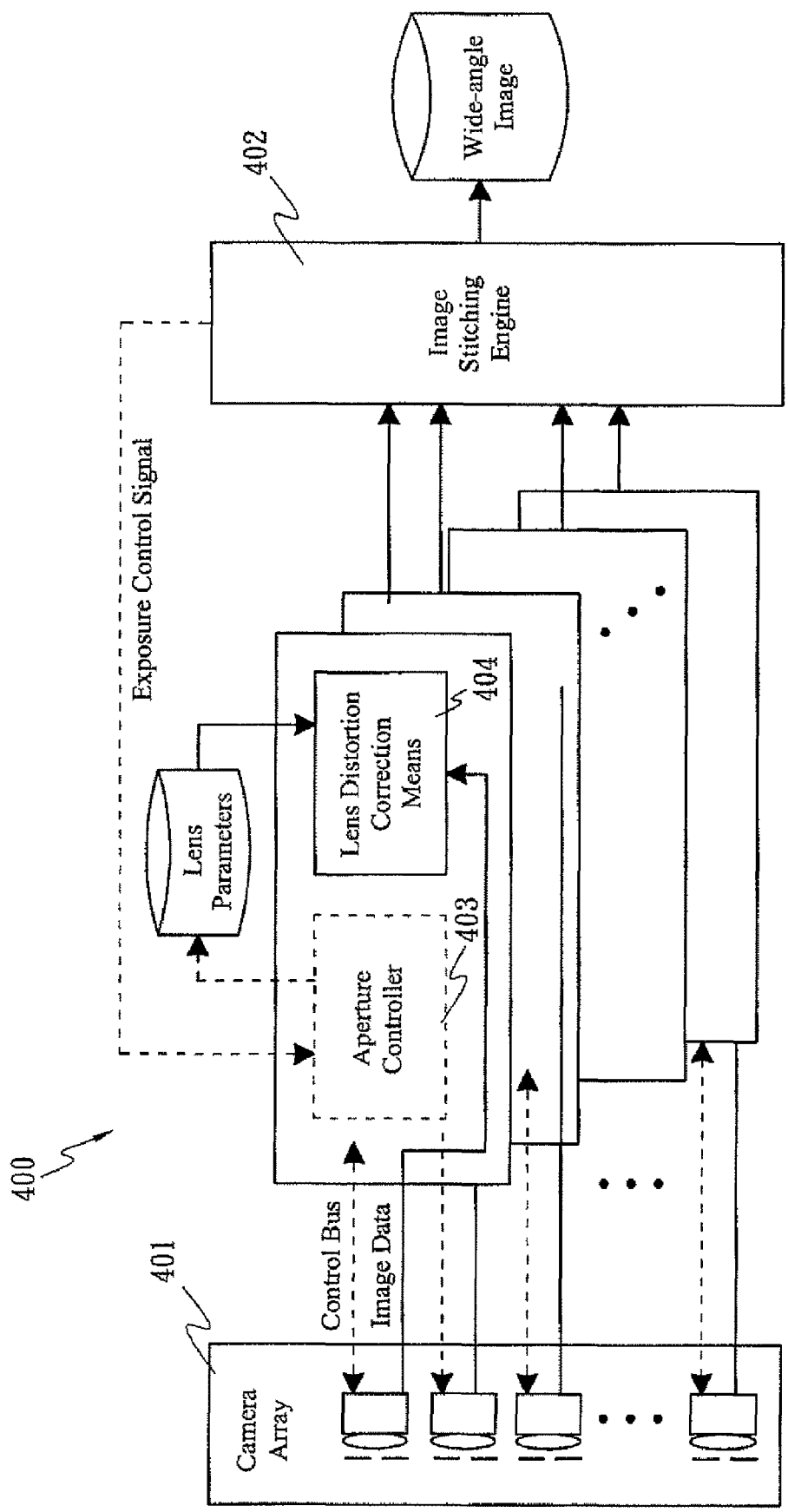
FIG. 4 is a schematic view of the multi-camera system according to an embodiment of the present invention.

Referring to FIG. 4, a multi-camera system 400 according to the present invention is illustrated. The multi-camera system 400 comprises a camera array 401, an image stitching engine 402, optional aperture controllers 403, and lens distortion correction means 404. The lens distortion correction means 404 may utilize any suitable algorithm for correcting lens distortion. Taking the polynomial algorithm for example, coefficients of the polynomial are calculated to fit the curve of the lens data. The coefficients are stored as lens parameters, and the lens distortion correction maps each pixel to the undistorted position by applying the polynomial to each pixel. Mapping table can be applied to all lens distortion correction algorithms where the corrected position of each pixel is stored in a table. The mapping table is calculated based on the applied mathematics equation. In the case of applying the mapping table, the lens parameters are the data of the table, and the mapped coordinates after correction may be fractional. Different interpolations may be applied to calculate the image data on each pixel depending on the cost and quality required by the system.

If the multi-camera system 400 does not include the aperture controllers 403, i.e. the apertures of the cameras in the camera array 401 are fixed, the lens parameters are independent of the brightness of the images and remain constant. On the contrary, if the multi-camera system 400 includes the aperture controllers 403, i.e. the apertures of the cameras in the camera array 401 are controllable, an exposure control signal is sent by the image stitching engine 402 to the aperture controllers 403 based on the brightness of the images to perform feedback control to the apertures of the camera array 401. The lens parameters used for lens distortion correction vary with the diameters of the apertures, hence the lens parameters are calculated based on the aperture control.

Figure 1:
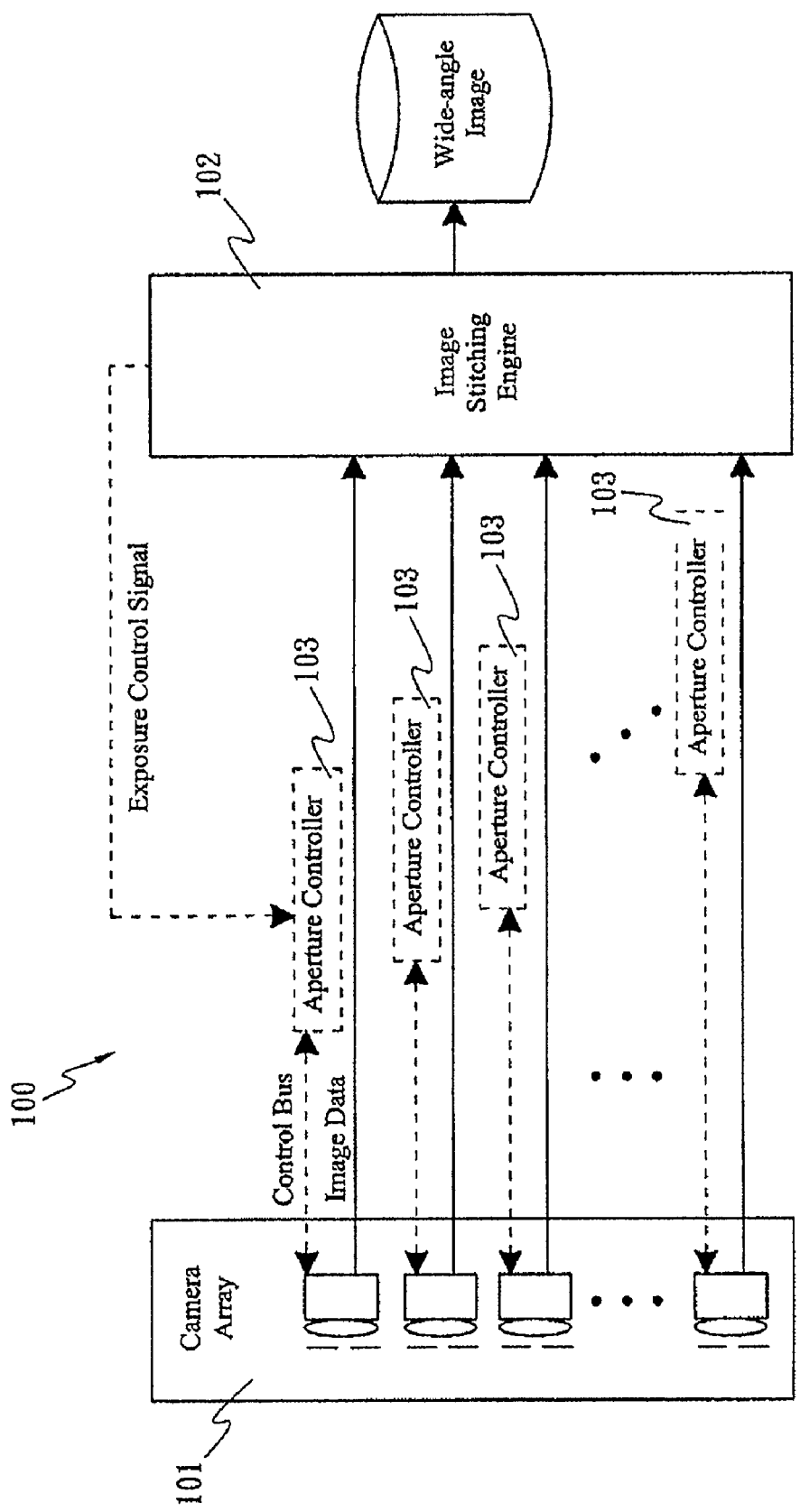
FIG. 1 is a schematic view of the conventional multi-camera system.
Figure 2:
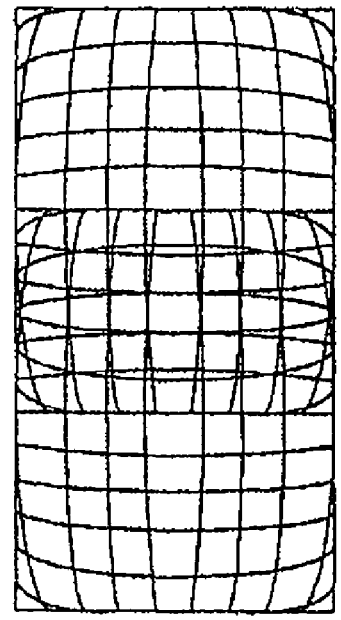
FIG. 2 illustrates an example of lens distortion.
Figure 2:
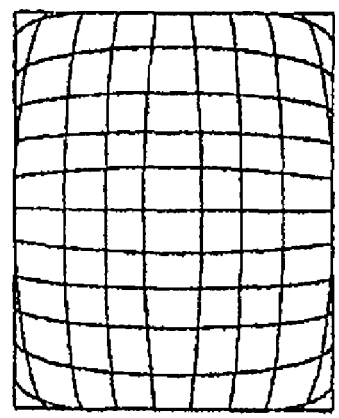
Figure 2:
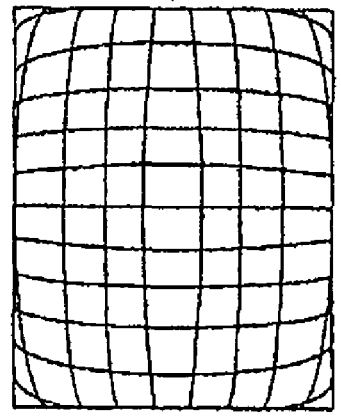
Figure 3:
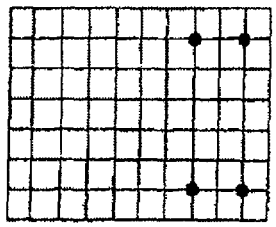
FIG. 3 illustrates an example of image transformation inaccuracy caused by lens distortion.
Figure 3:
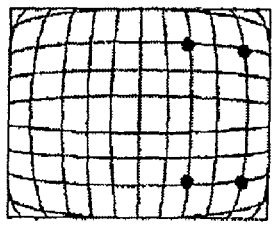
Figure 3:
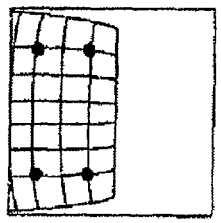
Figure 3:
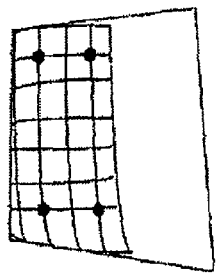
Figure 5:
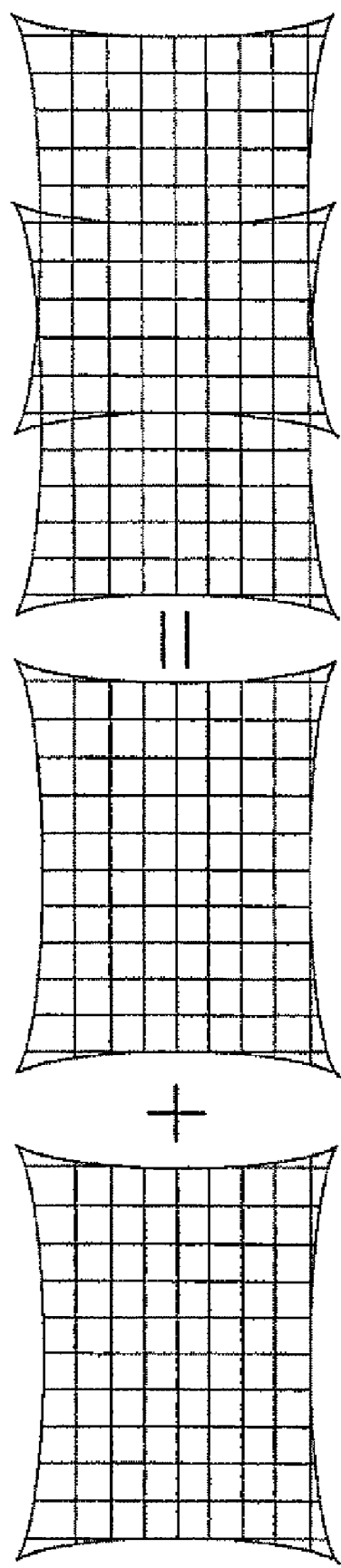
FIG. 5 illustrates an example of lens distortion correction by the multi-camera system of the present invention.

Compared with the example of barrel distortion shown in FIG. 2, FIG. 5 illustrates an example of correcting pin-cushion distortion by the multi-camera system of the present invention. As shown, the features in the overlapping region of the images are corrected and match with the features in overlapping region of the adjacent image.

Figure 6:
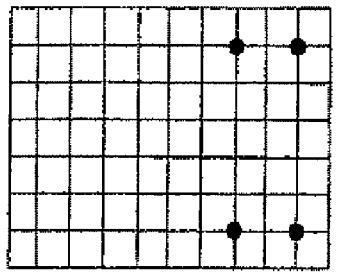
FIG. 6 illustrates an example of improving image transformation accuracy by lens distortion correction.
Figure 6:
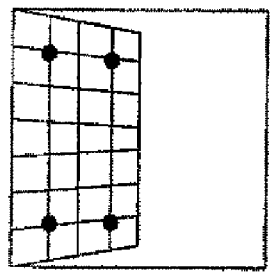
Figure 6:
Figure 6:
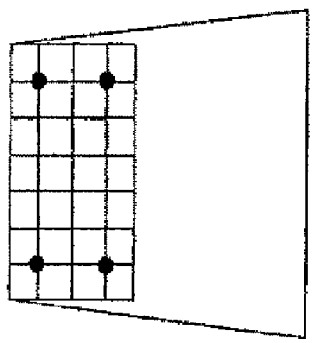

FIG. 6 is a schematic view of improving image transformation accuracy by lens distortion correction, wherein since the image captured by the rotated camera is accurately transformed to the reference plane because the points are no longer distorted, the transformation matrix is accurately calculated based on the undistorted points.

Figure 7:
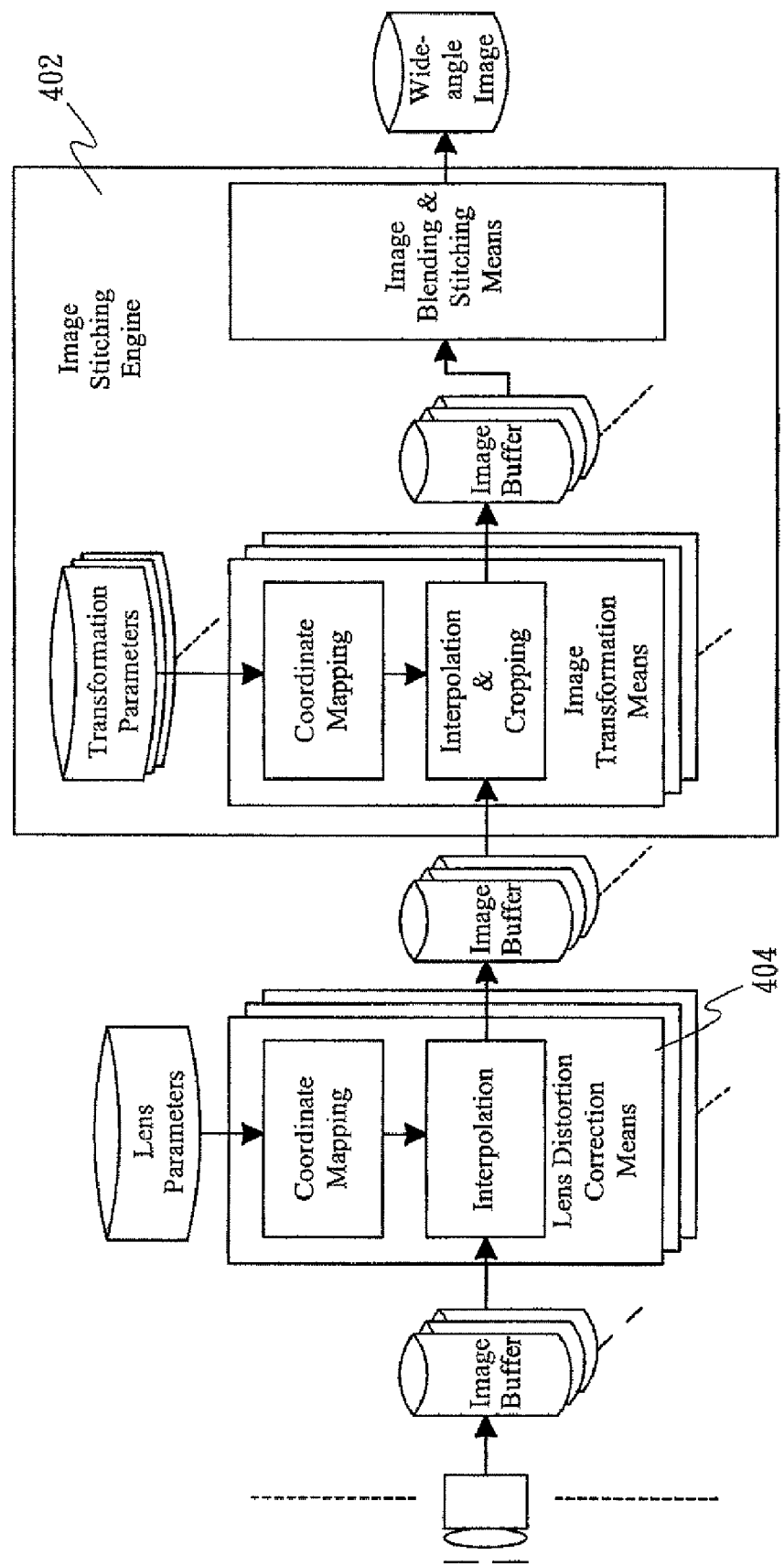
FIG. 7 illustrates the details of the means for correcting lens distortion and the image stitching engine shown in FIG. 4.

FIG. 7 illustrates the details of the lens distortion correction means 404 and the image stitching engine 402 shown in FIG. 4. The image stitching engine 402 mainly includes "image transformation means" and "image blending and stitching means". The image transformation means generates transformed coordinates based on transformation parameters. The generated coordinates may be fractional. The image data is then calculated by interpolation. Some transformation (e.g. planar transformation) makes the image stretch out, while some transformation squeezes the image and leaves black portion on the margin of the image. The extra black portion generated by transformation is removed from the transformed image by cropping. The image blending and stitching means generates the wide-angle image based on the image data acquired from the image transformation means.

Further, the lens distortion correction means 404 generates corrected coordinates based on the lens parameters. As described above, interpolation is required for correcting lens distortion, therefore additional image buffers should be included in the multi-camera system 400 to store the corrected image data after lens distortion correction. The additional image buffers are not a problem in the case of using software for stitching, but imply more memories in terms of hardware. For the multi-camera system of high resolution and high frame rate video, the memory access bandwidth and the memory density are both high. Therefore, the additional image buffers might exceed the limitation of memory access bandwidth. As a result, the present invention further provides another optimized multi-camera system including lens distortion correction means, which is combined with the image transformation means to save the additional image buffers.

Figure 8:
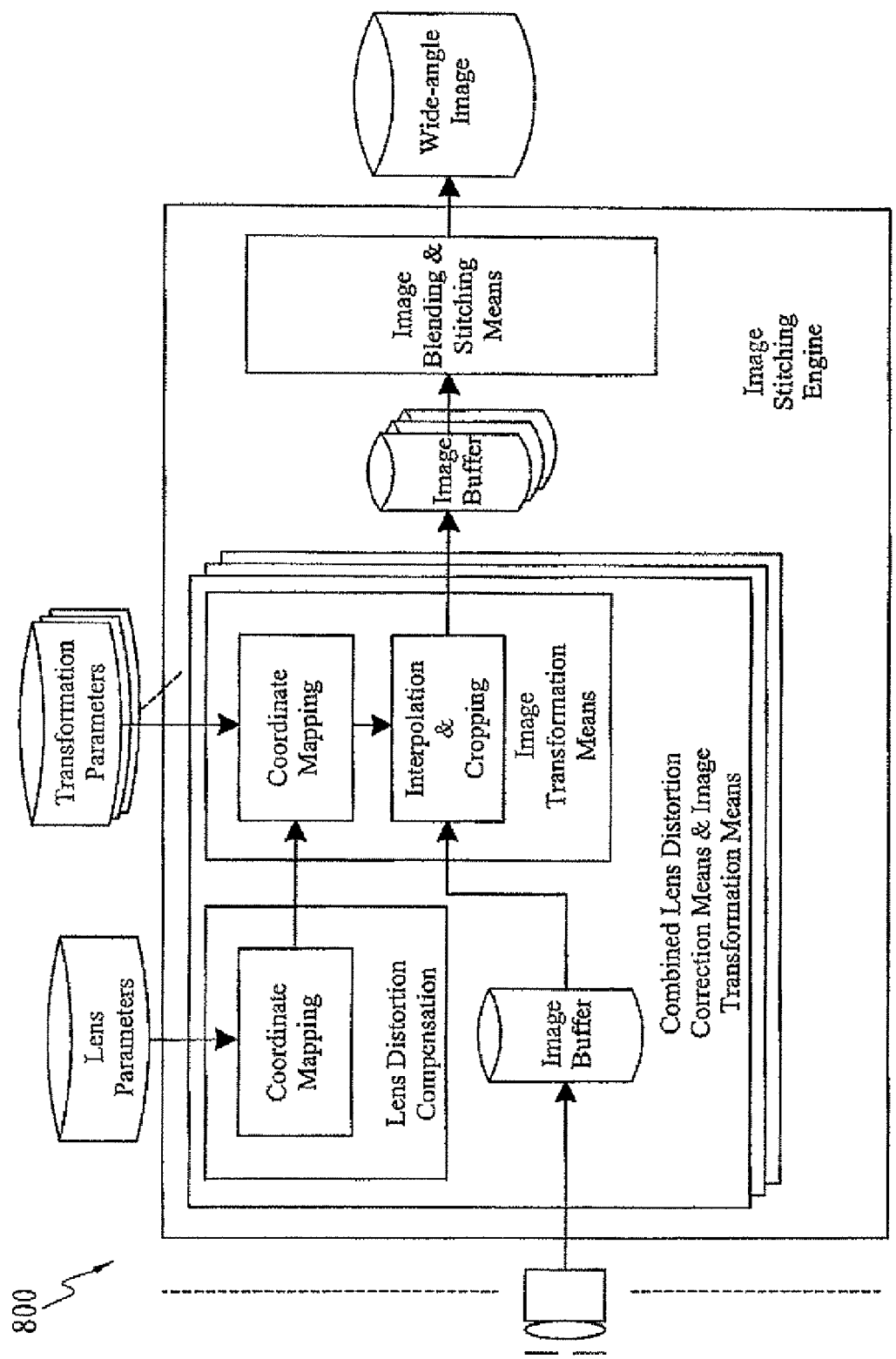
FIG. 8 is a schematic view of the optimized multi-camera system according to another embodiment of the present invention.

FIG. 8 illustrates an optimized multi-camera system 800 including lens distortion correction means according to another embodiment of the present invention. As described above, the lens distortion correction means is combined with the image transformation means in the multi-camera system 800. As shown, the corrected coordinates after lens distortion correction are inputted into the image transformation means for further performing coordinate mapping based on the transformation parameters. The interpolation is then performed only once to calculate the final image data. Hence no extra image buffers are required for the multi-camera system 800, and the quality of the image is not degraded due to extra interpolation by lens distortion correction.

Although only several embodiments of the invention have been described in detail above, those of ordinary skill in the art will understand that many modifications are possible without departing from the novel features of the invention. The modifications are intended to be included within the scope of this invention as defined by the following claims.

What is claimed is:

1. A device for improving image stitching accuracy, comprising:
    a camera array comprising of a plurality of cameras for capturing images to which a plurality of aperture controllers are connected respectively;
    means for correcting the lens distortion of each captured image using a lens parameter derived from feedback from the aperture controller connected to the camera that captured the image, wherein the lens parameter is distinct from the aperture setting of the camera that captured the image and one of a plurality of lens parameters; and
    an image stitching engine for transforming the captured images and stitching the transformed images into a seamless wide-angle image, the image stitching engine comprising a means for transforming the captured images,
    wherein the means for transforming the captured images receives corrected coordinates as input from the means for correcting the lens distortion, creating a corrected and transformed image.

2. The device according to claim 1, wherein the image stitching engine sends an exposure control signal to the aperture controllers based on brightness of the captured images to control apertures of the cameras.

3. The device according to claim 1, wherein the means for correcting the lens distortion performs coordinate mapping, the coordinate mapping generating corrected coordinates for the captured images based on the plurality of lens parameters.

4. The device according to claim 3, wherein the means for correcting lens distortion utilizes a polynomial algorithm, and the plurality of lens parameters are polynomial coefficients or a mapping table of the corrected coordinates.

5. The device according to claim 1, wherein the image stitching engine further comprises means for blending and stitching the transformed images, and wherein the means for transforming the captured images performs coordinate mapping and interpolation and cropping, and the means for transforming the captured images generates transformed coordinates based on transformation parameters.

6. The device according to claim 5, wherein the means for transforming the captured images outputs the transformed images to an image buffer.

7. The device according to claim 6, wherein the interpolation is performed only once.

8. A method for improving image stitching accuracy, comprising:
    capturing images by a camera array comprising a plurality of cameras to which a plurality of aperture controllers are connected respectively;
    correcting lens distortion for each captured image using a lens parameter derived from feedback from the aperture controller connected to the camera that captured the image, wherein the lens parameter is distinct from the aperture setting of the camera that captured the image and one of a plurality of lens parameters; and
    transforming the captured images and stitching the transformed images into a seamless wide-angle image, wherein the transforming includes receiving an input of corrected coordinates from correcting the lens distortion and creating a corrected and transformed image.

9. The method according to claim 8, wherein the method further comprises sending an exposure control signal to the aperture controllers based on brightness of the captured images to control apertures of the cameras.

10. The method according to claim 9, wherein correcting the lens distortion comprises coordinate mapping, the coordinate mapping generates corrected coordinates for the captured images based on the plurality of lens parameters.

11. The method according to claim 10, wherein correcting the lens distortion utilizes a polynomial algorithm, and the plurality of lens parameters are polynomial coefficients or a mapping table of the corrected coordinates.

12. The method according to claim 8, wherein transforming the captured images comprises coordinate mapping and interpolation and cropping, and transforming the captured images generates transformed coordinates based on transformation parameters.

13. The method according to claim 8, further comprising outputting the transformed images to an image buffer prior to stitching the images.

14. The method according to claim 13, wherein the interpolation is performed only once.

* * * * *